H. I. Brunner,
Stone-Channeling Machine.

No. 12,270.  Patented Jan. 23, 1855.

UNITED STATES PATENT OFFICE.

HENRY I. BRUNNER, OF NAZARETH, PENNSYLVANIA.

INSTRUMENT FOR CUTTING OUT STONE.

Specification of Letters Patent No. 12,270, dated January 23, 1855.

*To all whom it may concern:*

Be it known that I, HENRY I. BRUNNER, of Nazareth, in the county of Northampton and State of Pennsylvania, have invented a new and Improved Machine for Cutting Out Stone from Quarries; and I do hereby declare that the following is a full, clear, and exact description of the construction and operation of the same, reference being had to the annexed drawings, making a part of this specification, in which—

Figure 1:
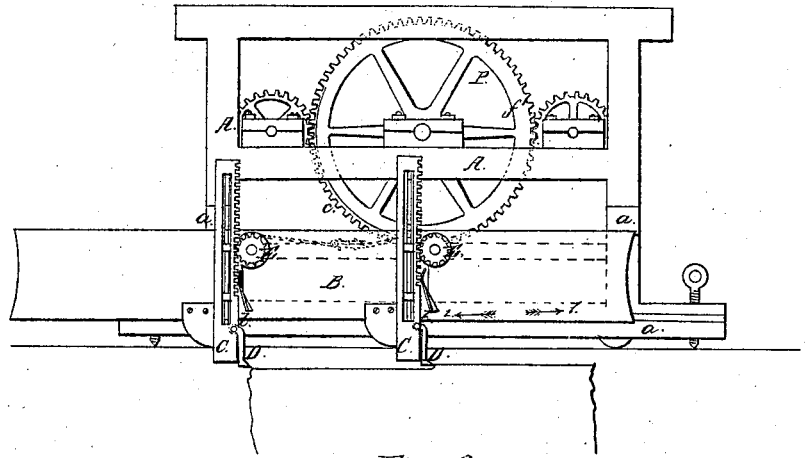
Figure 2:
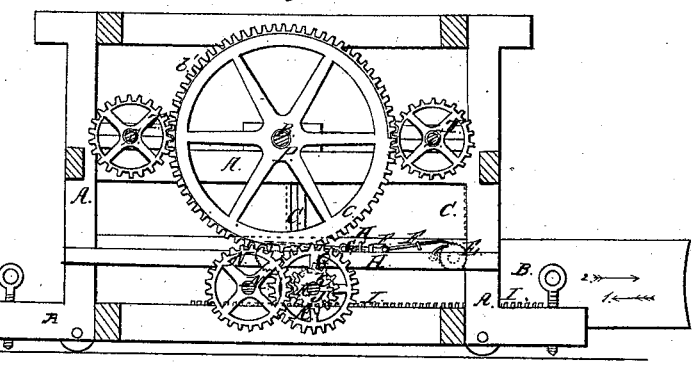
Figure 3:
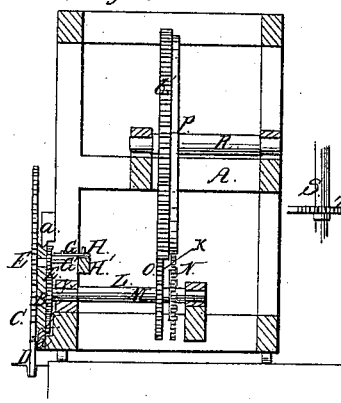
Figure 4:
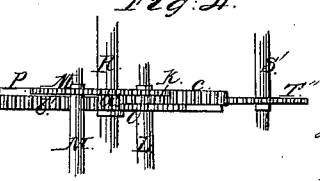
Figure 6:
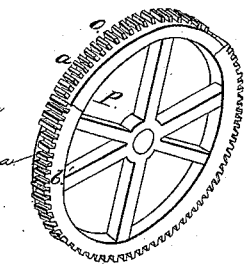
Figure 5:
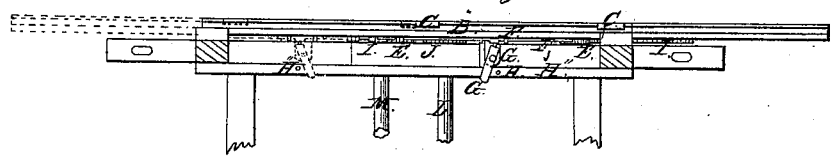

Figure 1, is a side elevation of my improved machine. Fig. 2, is a longitudinal vertical section of same. Fig. 3, is a transverse vertical section of same. Fig. 4, is a detached inverted plan of the toothed wheel and pinions by which the reciprocating motion is given the cutter stock. Fig. 5, is a detached plan or top view of the cutter stock, and the pawls ratchets and levers by which the necessary feed movement is given the cutters. Fig. 6 is a detached perspective view of a toothed wheel of the machine.

Similar letters of reference indicate corresponding parts in the several drawings.

This invention relates to a new and improved machine for cutting out stone from quarries, and consists in the employment or use of a reciprocating cutter stock operated as will be hereafter shown, and the peculiar means employed for giving the necessary feed motion to the cutters.

To enable others skilled in the art to make and use my invention, I will proceed to describe its construction and operation.

A represents a frame constructed in any proper manner to support the working parts of the machine.

B Figs. 1, 2, 3 and 5, is a cutter stock which works between ways or guides (a) at one side of the frame A and at its lower part. On the outer side of the cutter stock there are two vertical racks C, C, which are fitted in grooves in the side of the stock and have cutters D D attached to their lower ends, one cutter to each rack, as shown in Fig. 1. The cutters D D are attached to the racks C by pivots so that their lower ends or cutting edges may be raised in one direction, viz, outward from the racks.

E E are pinions which gear into the racks C as shown in Figs. 1 and 3. The axes of these pinions pass through the cutter stock B and have ratchets E' on their inner ends see Figs. 2 and 3.

F F are two pawls, the inner ends of which are attached by pivots to a rod F' which works freely in loops or staples on the inner side of the cutter stock B, see Figs. 2 and 5.

G is a lever the inner end of which is secured to the rod F', the lever being attached by a pivot to a support or lateral projection G' attached to the inner side of the cutter stock, see Figs. 3 and 5.

H' is a bar attached to the lower end of the frame A. The outer end of the lever G rests upon this bar which is provided with vertical stops H, H'' see Figs. 2, 3 and 5.

On the inner side of the cutter stock B there is a rack I, see Figs. 2, 3 and 5 in which a pinion J, gears, said pinion being attached to one end of a shaft L, on the opposite end of the shaft L there are two pinions O, K, one of which O, gears into a toothed wheel P during a portion of its revolution, and the other pinion K gears into a pinion N on a shaft M which is parallel with the shaft L as shown in Figs. 4 and 5. The pinion N also gears into the toothed wheel P during a portion of its revolution, the two pinions N, O, alternately gearing into the toothed wheel P.

R is the shaft of the pinion P and S, S' are two shafts one at each side of the shaft R and parallel with it. The two shafts S, S', are provided with pinions T T' which gear into the toothed wheel P.

The toothed wheel P has its teeth peculiarly arranged. One portion of the teeth, the center portion, shown in white Fig. 4 are designated by (a') extends around the whole periphery of the wheel, and the pinions T T' gear into this portion (a'). The ends of the teeth, each side of the center portion (a) do not extend wholly around the wheel, but only a portion of it, as shown in Figs. 2, 4, and Fig. 6, the portion colored blue, and designated by (b'), extending around a greater surface of the wheel that the portion colored red and designated by (c). The pinion N, underneath the wheel P, when said pinion is in gear with the wheel P mashes into the red portion (c) of the teeth of the wheel P, and the pinion O, mashes into the blue portion (b') of the teeth of the wheel, as clearly shown in Fig. 4.

Operation: The frame A is properly placed in the quarry so that the cutter stock B will be over the spot where the cutters are intended to operate. Motion is then given the shafts S, S' one or both of them and the toothed wheel P is rotated and motion communicated alternately to the two pinions O, N, the pinion O being made to rotate when the portion (b') of the teeth of the wheel P gear into it and giving a motion to the cutter stock in the direction indicated by arrow 1 see Figs. 1 and 2. And when the portion (b') of the teeth of the wheel P have passed off of the pinion O it ceases to rotate and the portion (c) of the teeth of the wheel P gear instantly into the pinion N which works into the smaller pinion K on the same shaft L as the pinion O, and consequently an accelerated return movement is given the cutter stock B in the direction of arrow 2. The cutter stock thus has reciprocating motion given it and during the movement of the stock in the direction of arrow 1, the cutters D D act upon the stone and cut it, the points or edges of the cutters during the return movement of the stock yielding or moving outward from the racks C, C, in consequence of their attachment to the racks by the pivots (b).

The racks C, C, are moved downward at each forward movement of the stock B by means of the lever G striking against the stop or pin H on the bar H' said lever in consequence moving the pawls F F and turning the ratchets E' E' which cause the pinions E E to operate accordingly upon the racks C, C, and move them downward the distance of the table. At the end of the forward movement of the stock B the lever G strikes against the stop or pin H'' and the pawls F F are moved back to their original position so as to act upon the ratchets as before stated at the forward movement of the stock.

The above machine works well in practice, it has been tested in cutting slate and a vast deal of labor is saved by its use and the waste attending the cutting out of slate by the usual hand labor is saved, one, two or more cutters may be employed according to the hardness of the stone to be cut.

It will be understood that the cutters are made to cut sufficiently deep grooves into the slate or stone as to allow the blocks which are surrounded by the grooves to be broken off.

Having thus described my invention, what I claim as new and desire to secure by Letters Patent, is—

Cutting out slate or other stone from quarries by means of a cutter stock B provided with cutters D, D and having a reciprocating motion given it by means of a toothed wheel P in which pinions O, N are made to gear alternately in consequence of the arrangement of the teeth on the periphery of said wheel P as herein shown said cutters D D having the proper feed motion given them by the pawls F F, ratchets E' E' pinions E, E, and racks C, C, or other substantially equivalent device operating as set forth.

HENRY I. BRUNNER.

Witnesses:
 CHRISTIAN D. BUSSE,
 RICHARD MIKSEH.